(12) United States Patent
Kulis, Jr. et al.

(10) Patent No.: US 8,974,725 B2
(45) Date of Patent: Mar. 10, 2015

(54) FRICTION MATERIAL TOOLING

(71) Applicant: Federal-Mogul Products, Inc., Southfield, MI (US)

(72) Inventors: Stanley Frank Kulis, Jr., Cookeville, TN (US); Carl Richard Buxton, Cookeville, TN (US)

(73) Assignee: Federal-Mogul Products, Inc., Southfield, MI (US)

( * ) Notice: Subject to any disclaimer, the term of this patent is extended or adjusted under 35 U.S.C. 154(b) by 230 days.

(21) Appl. No.: 13/627,120

(22) Filed: Sep. 26, 2012

(65) Prior Publication Data

US 2013/0082420 A1 Apr. 4, 2013

Related U.S. Application Data

(60) Provisional application No. 61/540,858, filed on Sep. 29, 2011.

(51) Int. Cl.
  *B29C 45/03* (2006.01)
  *F16D 69/04* (2006.01)
  *B29C 43/18* (2006.01)

(52) U.S. Cl.
  CPC ............... *B29C 45/03* (2013.01); *B29C 43/18* (2013.01); *F16D 2250/0084* (2013.01); *F16D 2250/0092* (2013.01); *F16D 69/04* (2013.01); *F16D 2069/0483* (2013.01)
  USPC ...... 264/642; 264/319; 264/328.16; 425/542; 425/577

(58) Field of Classification Search
  CPC  B29C 43/003; B29C 43/18; B29K 2105/251; B29K 2503/04
  USPC .......... 264/328.1, 328.16, 319, 642; 425/542, 425/577; 29/527.1, 428
  See application file for complete search history.

(56) References Cited

U.S. PATENT DOCUMENTS

| | | | |
|---|---|---|---|
| 1,336,752 A | 4/1920 | Muller | |
| 3,190,397 A | 6/1965 | Sudres | |

(Continued)

FOREIGN PATENT DOCUMENTS

| | | | |
|---|---|---|---|
| DE | 102008006817 | * | 8/2009 |
| FR | 1440107 A | | 5/1966 |
| FR | 2192664 A5 | | 2/1974 |

OTHER PUBLICATIONS

International Search Report PCT/US2012/057478 mailed on Jan. 9, 2013.

*Primary Examiner* — Jill Heitbrink
(74) *Attorney, Agent, or Firm* — Robert L. Stearns; Dickinson Wright, PLLC (57) ABSTRACT

A method for producing a brake assembly (22) including friction material (24) molded to a backplate (26) using an improved receptacle plate (20) is provided. The backplate (26) includes openings (30) each having an opening diameter ($D_o$). The receptacle plate (20) includes pins (28) extending transversely from a receiving surface (34). The method includes aligning the openings (30) of the backplate (26) with the pins (28) of the receptacle plate (20). Each pin (28) has a pin diameter ($D_p$) less than the opening diameter ($D_o$) of the aligned opening (30). The friction material (24) is molded to the backplate (26) by heating the friction material (24) and the receptacle plate (20), and forcing the friction material (24) through the openings (30) of the backplate (26). The pins (28) extend into a center portion (32) of the friction material (24) and improve the degree of curing of the friction material (24).

21 Claims, 5 Drawing Sheets

(56) References Cited

U.S. PATENT DOCUMENTS

| | | |
|---|---|---|
| 3,422,937 A | 1/1969 | Gage |
| 4,599,772 A | 7/1986 | Graham |
| 5,041,471 A * | 8/1991 | Brinzey .................. 523/153 |
| 5,141,083 A | 8/1992 | Burgoon |
| 5,255,762 A | 10/1993 | Beri |
| 5,732,800 A | 3/1998 | Spigener |
| 5,839,550 A | 11/1998 | Redgrave et al. |
| 6,279,222 B1 | 8/2001 | Bunker et al. |
| 7,568,561 B2 | 8/2009 | Bosco, Jr. |
| 7,731,004 B2 | 6/2010 | Roehling |
| 2005/0048160 A1 | 3/2005 | Sakamoto et al. |
| 2007/0051572 A1 | 3/2007 | Beri |
| 2009/0250300 A1 | 10/2009 | Bosco, Jr. |

* cited by examiner

FRICTION MATERIAL TOOLING

CROSS REFERENCE TO RELATED APPLICATION

This application claims the benefit of U.S. provisional application Ser. No. 61/540,858 filed Sep. 29, 2011, the entire contents of which is incorporated herein by reference in its entirety.

BACKGROUND OF THE INVENTION

1. Field of the Invention

The invention relates generally to tools used to form brake assemblies for automotive vehicles, and methods of forming the brake assemblies.

2. Related Art

Automotive vehicle brake applications typically include a brake assembly comprising a pad of friction material attached to backplate for engaging a disc to stop the automotive vehicle. An example of such a brake assembly is disclosed in U.S. Patent Application Pub. No. 2005/0082124 to Kulis et al. The friction material of the brake assembly should provide an acceptable friction coefficient, wear resistance, thermal insulation, and vibration attenuation. The friction material is preferably formed of non-asbestos materials, such as minerals, organic particles, ceramics, aramids, and resins. The friction material is molded to the backplate and cured. Examples of acceptable friction materials and methods of attaching the friction material to the backplate are disclosed in U.S. Pat. No. 5,413,194 to Kulis et al.

SUMMARY OF THE INVENTION

One aspect of the invention provides an improved tool for producing a brake assembly including a friction material molded to at least one opening of a backplate. The tool comprises a receptacle plate formed of a metal material. The receptacle plate presents a receiving surface for supporting the backplate. The receptacle plate includes at least one pin extending transversely from the receiving surface for extending through one of the openings of the backplate and transferring heat to the friction material when the friction material is forced into the openings.

Another aspect of the invention provides a method for producing a brake assembly including a friction material molded to a backplate. The method includes providing a backplate including a front surface and an oppositely facing back surface and at least one opening extending from the front surface to the back surface, wherein the openings each have an opening diameter. The method also includes providing a receptacle plate including a receiving surface and at least one pin extending transversely from the receiving surface. The method next includes aligning the openings of the backplate with the pins of the receptacle plate, wherein the pins each have a pin diameter less than the opening diameter of the aligned opening. The method further includes disposing a friction material on the front surface of the backplate, heating the friction material and the receptacle plate, and forcing the friction material through the openings of the backplate and along the pins.

The receptacle plate with pins transfers additional heat to the friction material, compared to a receptacle plate of the prior art without the pins. The pins provide a significant amount of heat to the interior or center portion of the friction material. During the molding process, the temperature at the center portion of the friction material increases faster, and the temperature is higher than it would be if the receptacle plate included no pins. The faster heating and higher temperature improves the degree of curing of the friction material and reduces or eliminates the susceptibility of the friction material to delaminate from the backplate or internally. The improved curing provided by the receptacle plate with pins also reduces or eliminates blistering of the friction material.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 8:
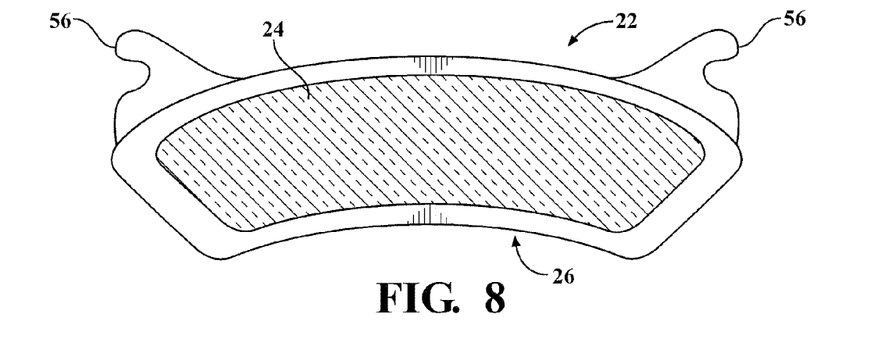
FIG. 8 is a top view of the friction material disposed on the backplate of FIG. 7 according to an embodiment of the invention.

One aspect of the invention provides a tool, referred to as a receptacle plate 20, for forming a brake assembly 22 including a friction material 24 molded to a backplate 26. Examples of the improved receptacle plate 20 are shown in FIGS. 1-7 and an example of the brake assembly 22 produced using the receptacle plate 20 is shown in FIG. 8. Another aspect of the invention provides a method of forming the brake assembly 22 using the improved receptacle plate 20. The receptacle plate 20 includes at least one pin 28, but typically a plurality of pins 28 for extending through openings 30 of the backplate 26. During the molding process, the pins 28 of the receptacle plate 20 are aligned with the openings 30 of the backplate 26, and the friction material 24 is heated and forced through the openings 30 of the backplate 26. The heated friction material 24 flows to the receptacle plate 20 and the pins 28 extend into the friction material 24. The pins 28 provide additional heat to the center portion 32 of the friction material and improve the degree of curing.

FIGS. 1-6 show the receptacle plate 20 including a plurality of pins 28, according to preferred embodiments. The receptacle plate 20 can be formed of a metal material, such as a steel material. Various other metals can be used to form the receptacle plate 20, however the metal material typically has a thermal conductivity of at least 14 W/(m·K) for transferring heat to the friction material 24 during the molding step. Alternately, the receptacle plate 20 can be formed of a non-metal material having a lower thermal conductivity than a metal, such as a ceramic material, carbon-based material, or organic type material.

As shown in FIGS. 1, 2, 5, and 6, the receptacle plate 20 presents a receiving surface 34 and an oppositely facing compression surface 36. The receiving surface 34 and the compression surface 36 are typically parallel to one another and extend continuously between and are surrounded by receptacle outer surfaces 38. The receptacle plate 20 presents a receptacle plate thickness $t_r$ extending from the compression surface 36 to the receiving surface 34. The receptacle plate thickness $t_r$ can be adjusted depending on the type of friction material 24 and desired degree of cure during the molding step.

The pins 28 of the receptacle plate 20 are spaced form one another by the receiving surface 34 and extend transversely from the receiving surface 34. The pins 28 are placed in predetermined locations, depending on the location of the openings 30 of the backplate 26, so that during the molding step, the pins 28 are aligned with the openings 30 of the backplate 26. The pins 28 provide additional heat to the friction material 24, in addition to the heat provided by the receiving surface 34 of the receptacle plate 20.

Figure 2:
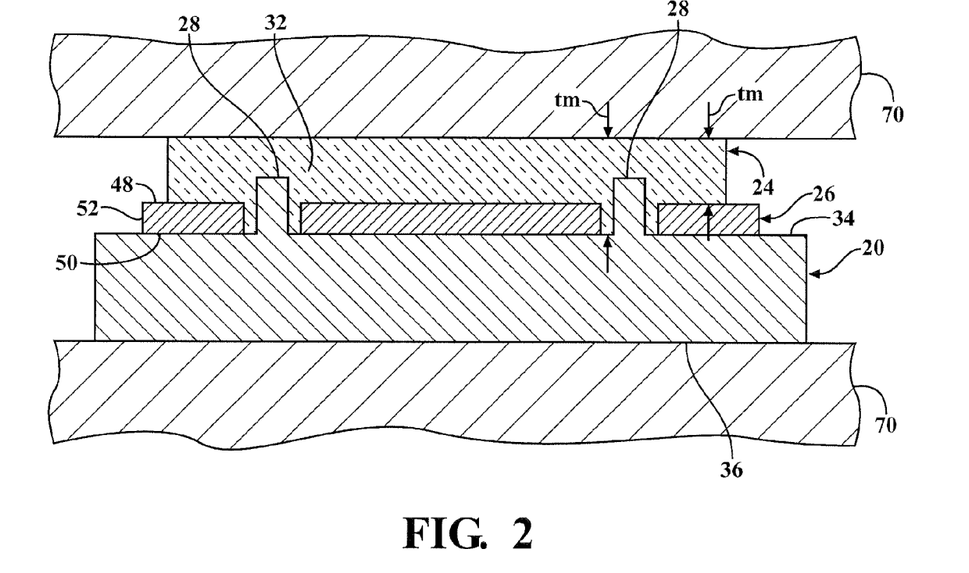
FIG. 2 is a cross-sectional view of the receptacle plate of FIG. 1 along line 2-2, and also a backplate, a friction material, and compression plates according to an embodiment of the invention.
Figures 2A, 2B, 2C:
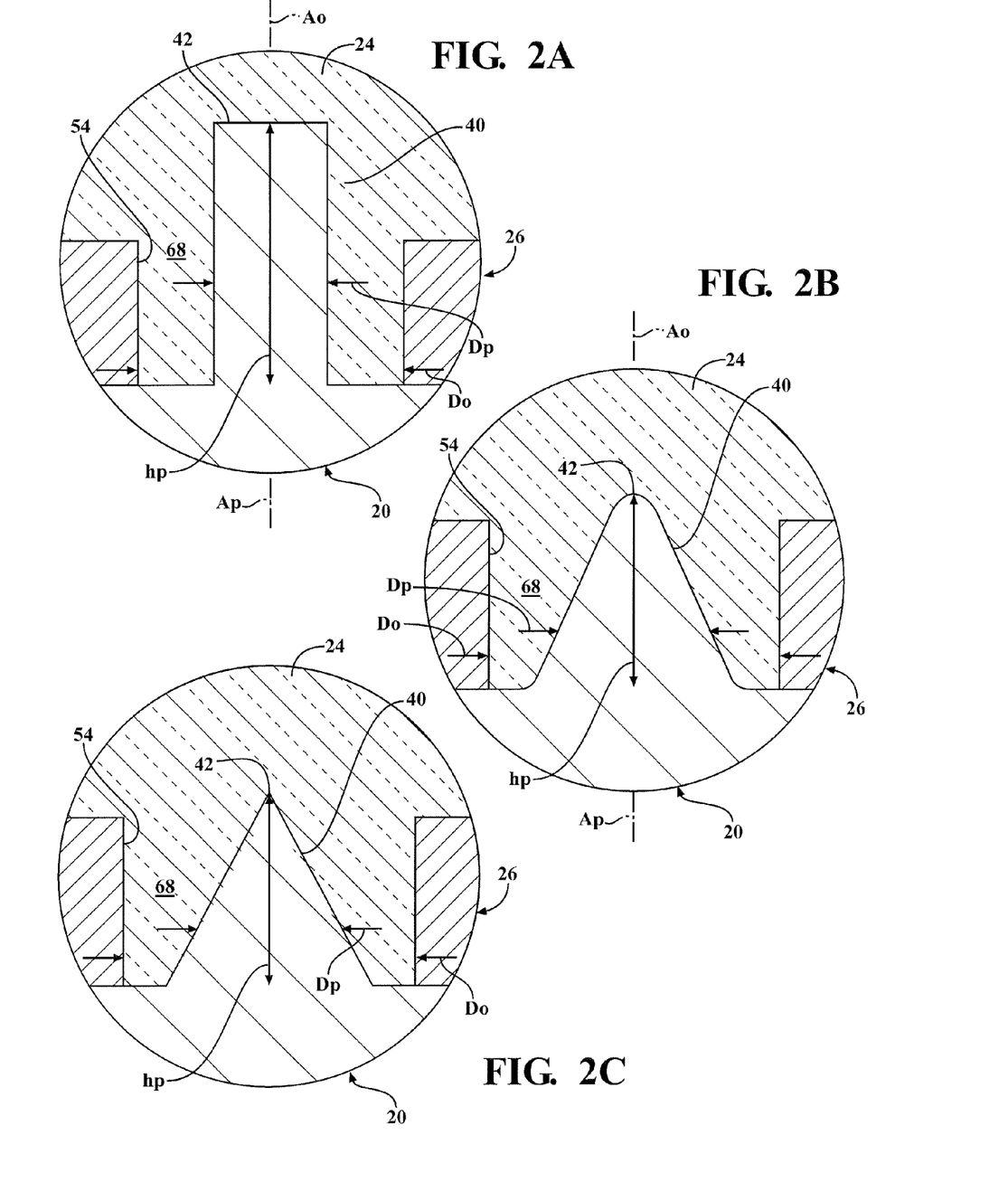
FIG. 2A is an enlarged cross-sectional side view of the encircled area of FIG. 2 showing a pin of the receptacle plate.
FIG. 2B is an alternate embodiment of the pin of FIG. 2A.
FIG. 2C is another alternate embodiment of the pin of FIG. 2A.

As best shown in FIG. 2A, the pins 28 of the receptacle plate 20 each include a side surface 40 extending transversely or upwardly along a pin axis $A_p$ from the receiving surface 34 to a heat transfer surface 42. Both the side surface 40 and the heat transfer surface 42 of the pins 28 transfer heat to the friction material 24. The heat transfer surfaces 42 of the pins 28 face away from the receiving surface 34. Each pin 28 has a pin height $h_p$ extending from the receiving surface 34 to the heat transfer surface 42. The pin height $h_p$ can be adjusted depending on the type and amount of friction material 24, and desired amount of curing. According to one exemplary embodiment, the pin height $h_p$ is from 0.040 to 0.160 inches. As best shown in FIGS. 2A and 2B, each pin 28 presents a pin diameter $D_p$ extending parallel to the receiving surface 34. The pin diameter $D_p$ can vary along the pin height $h_p$, as shown in FIG. 2B.

Figure 1:
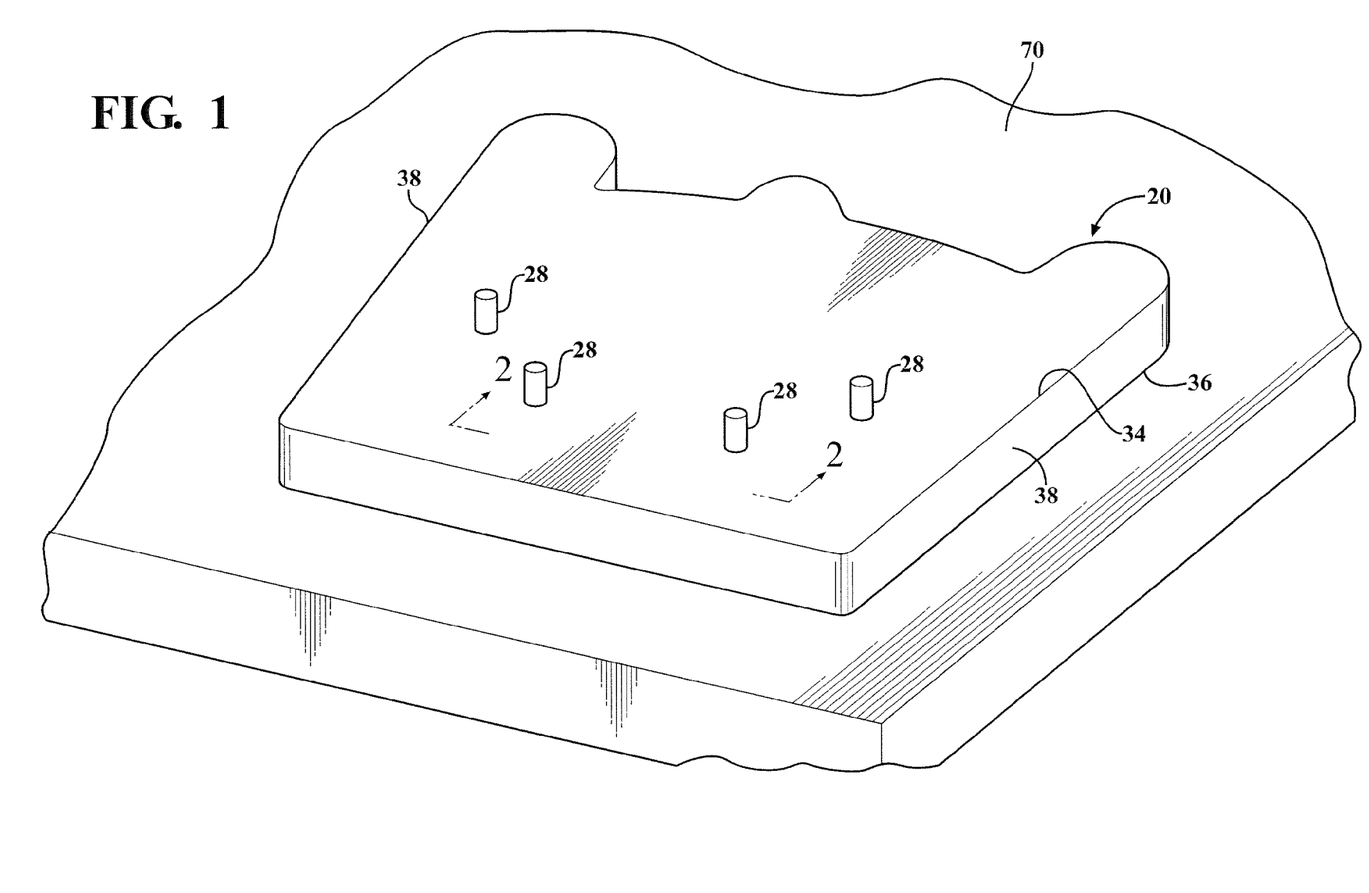
FIG. 1 is a perspective view of a receptacle plate according to one embodiment of the invention.
Figure 3:
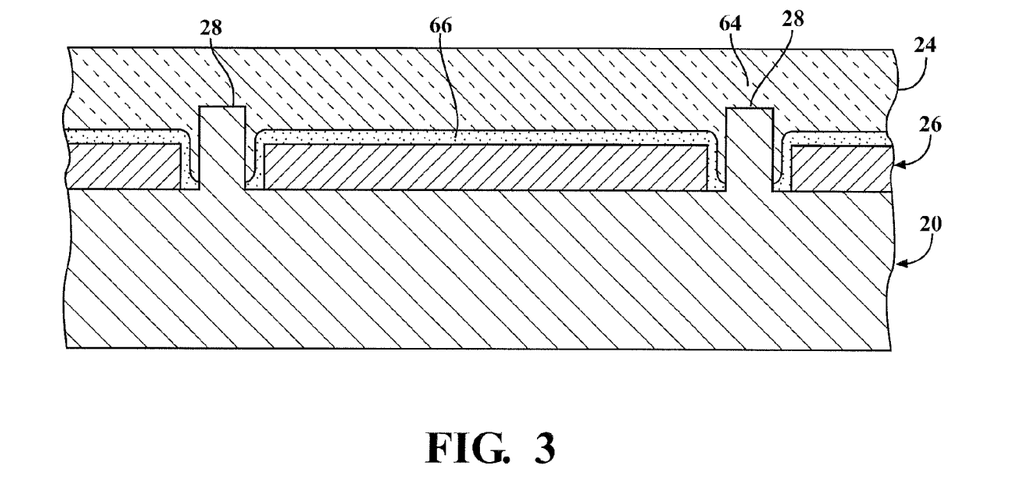
FIG. 3 is a cross-sectional view of the receptacle plate, the backplate, and the friction material according to another embodiment of the invention.

The receiving surface 34 and the pins 28 of the receptacle plate 20 can comprise various different geometries. However, in each embodiment, the pin diameters $D_p$ are designed to fit in the openings 30 of the backplate 26 such that the friction material 24 can flow around the pins 28 during the molding step. In the embodiment of FIGS. 1-3, the receiving surface 34 of the receptacle plate 20 is planar, the side surface 40 of each pin 28 extends perpendicular to the receiving surface 34, and the heat transfer surface 42 of each pin 28 extends parallel to the receiving surface 34. The side surface 40 of each pin 28 can alternatively extend at an angle relative to the receiving surface 34. In the embodiment of FIG. 2B, the side surface 40 of the pin 28 is tapered from the receiving surface 34 to the heat transfer surface 42, and the heat transfer surface 42 is round. Also in the embodiment of FIG. 2B, the pin diameter $D_p$ along the heat transfer surface 42 is less than the pin diameter $D_p$ along the receiving surface 34. In another alternate embodiment, as shown in FIG. 2C, the pin 28 presents a conical shape, such that the side surface 40 of the pin 28 tapers from the receiving surface 34 to the heat transfer surface 42, and the heat transfer surface 42 is a sharp point.

Figure 4:
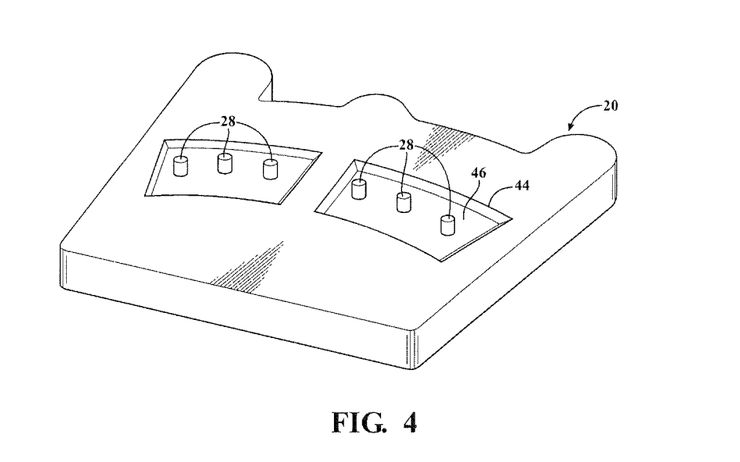
FIG. 4 is a perspective view of the receptacle plate according to another embodiment of the invention.
Figure 5:
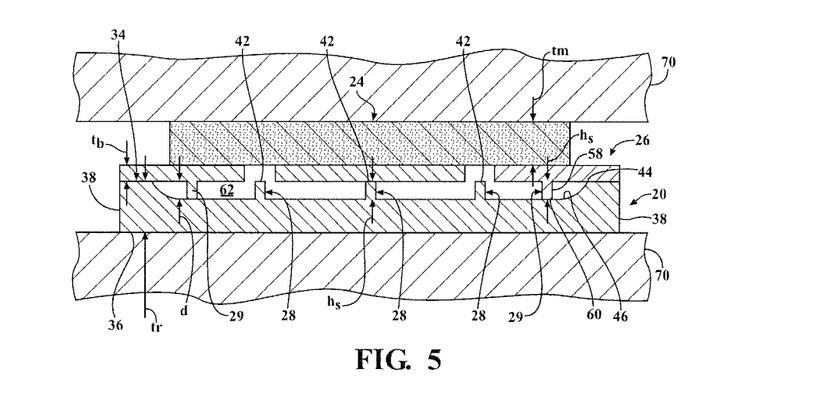
FIG. 5 is a cross-sectional view of the receptacle plate of FIG. 4, the backplate, the friction material, and the compression plates according to another embodiment of the invention.
Figure 6:
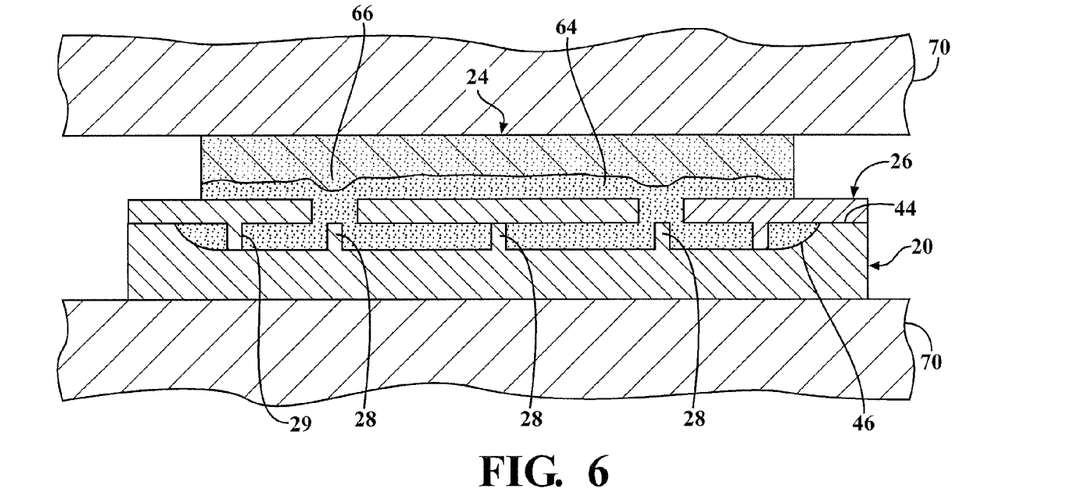
FIG. 6 is a cross-sectional view of the receptacle plate of FIG. 4, the backplate, the friction material, and the compression plates according to yet another embodiment of the invention.
Figure 7:
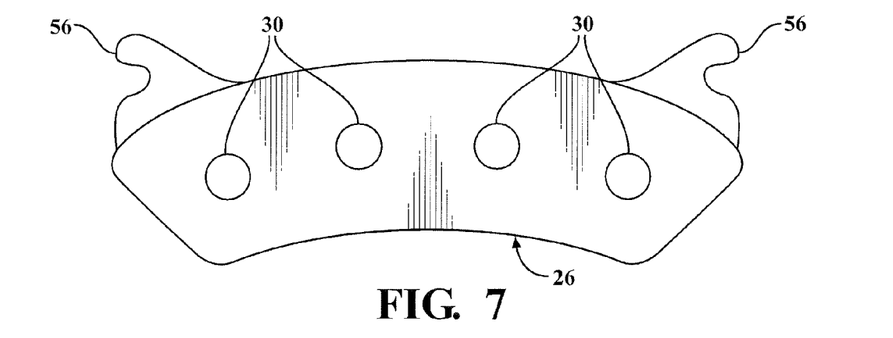
FIG. 7 is a top view of the backplate according to an embodiment of the invention.

In one preferred embodiment shown in FIGS. 4-6, the receiving surface 34 of the receptacle plate 20 presents a ledge 44 surrounding a depressed surface 46, also referred to as a depression or indentation. For example, the depressed surface can be concave. In this embodiment, the pins 28 are disposed in the depression and extend transversely or upwardly from the depressed surface 46. As shown in FIG. 5, the receptacle plate thickness $t_r$ along the ledge 44 is greater than the receptacle plate thickness $t_r$ along the depressed surface 46. The receptacle plate thickness $t_r$ decreases away from the ledge 44 to the base of the depressed surface 46.

In the embodiments of FIGS. 5 and 6, the receptacle plate thickness $t_r$ from the compression surface 36 to the heat transfer surface 42 of the pin 28, referred to as a first receptacle plate thickness, is equal to the receptacle plate thickness $t_r$ from the compression surface 36 to the ledge 44, referred to as a second receptacle plate thickness. In this embodiment, the pin height $h_p$ is equal to a distance d between the depressed surface 46 at the base of the pin 28 and the ledge 44. Alternatively, the pin height $h_p$ could be greater than or less than the distance d between the depressed surface 46 at the base of the pin 28 and the ledge 44. FIGS. 5 and 6 show the side surfaces 40 of the pins 28 extending perpendicular to the receiving surface 34, and the heat transfer surfaces 42 of the pins 28 being planar and parallel to the ledge 44. However, the pins 28 can comprise alternate geometries. In the embodiment of FIGS. 5 and 6, the ledge 44 and at least one of the pins 28 engage and support the backplate 26 during the molding step.

Another aspect of the invention is a method of forming the brake assembly 22 using the improved receptacle plate 20. The method includes providing the backplate 26 used to form the brake assembly 22. The backplate 26 is typically formed of a metal material, such as a steel material capable of meeting the demands of an automotive vehicle braking application. Various other metals can be used to form the backplate 26. Alternately, the backplate 26 can be formed of a non-metal material having a lower thermal conductivity than a metal, such as a ceramic material, carbon-based material, or organic type material. According to one embodiment, the backplate 26 is formed of a material having a lower thermal conductivity than the receptacle plate 20. For example, the receptacle plate 20 can formed of a metal material, such as steel, and the backplate 26 can be formed of a non-metal material, such as a ceramic material, carbon-based material, or organic type material.

An example of the backplate 26 is shown in FIG. 8. The backplate 26 includes a front surface 48 and an oppositely facing back surface 50, and typically the front surface 48 and the back surface 50 are parallel to one another, as shown in FIGS. 2, 3, 5 and 6. The front surface 48 and the back surface 50 extend continuously between and are surrounded by plate outer surfaces 52. The backplate 26 presents a backplate thickness $t_b$ extending from the back surface 50 to the front surface 48. In one embodiment, the backplate thickness $t_b$ is from 0.215 to 0.230 inches.

As shown in FIGS. 2, 3, and 5-7, the backplate 26 presents at least one opening 30, but typically a plurality of the opening 30 each extending continuously from the front surface 48 to the back surface 50. Each opening 30 of the backplate 26 is presented by an inner wall 54 extending around an opening axis $A_o$. The inner wall 54 typically presents a cylindrical shape with an opening diameter $D_o$, as best shown in FIGS. 2A and 2B. The backplate 26 may also include pair of mounting features 56 extending outwardly from the plate outer surfaces 52, as shown in FIG. 8, for mounting the backplate 26 within a vehicle application.

In one embodiment, as shown in FIGS. 5 and 6, the backplate 26 includes support pins 29 extending transversely from the back surface 50 for engaging the receptacle plate 20. Each support pin 29 includes an outer surface 58 extending upwardly from the back surface 50 to a support surface 60 and presenting a support pin height $h_s$. The support surface 60 engages the receiving surfaces 34 of the receptacle plate 20 during the molding process. In this embodiment, the support pin height $h_s$ is equal to the distance d between the depressed surface 46 and the ledge 44 of the receptacle plate 20.

The method also includes providing the receptacle plate 20 including the pins 28 extending transversely from the receiving surface 34. The step of providing the backplate 26 and providing the receptacle plate 20 includes providing at least one pin 28 having a pin diameter $D_p$ less than one of the opening diameters $D_o$ of the backplate 26. Preferably, the receptacle plate 20 includes a plurality of pins 28 and is designed so that one pin 28 can be aligned with each opening 30 of the backplate 26, and the pin diameter $D_p$ of each pin 28 is less than the opening diameter $D_o$ of the aligned opening 30.

In the embodiments of FIGS. 5 and 6, when the backplate 26 includes the support pins 29, the receptacle plate 20 typically includes the ledge 44 and depressed surface 46 to provide a channel 62 between the back surface 50 of the backplate 26 and the depressed surface 34 of the receptacle plate 20.

The method also includes preparing or providing the friction material 24. The friction material 24 can be any type of material used to form brake pads of automotive vehicle applications, such as a loose particulate mixture or a pre-compact form. The friction material 24 typical comprises a mixture of several components, such as minerals, organic particles, ceramics, aramids, resins, organic particles, cashew nut shell particles, rubber, metal particles, and binders. The friction material 24 preferably includes no asbestos. Examples of friction materials 24 that can be used to form the brake assembly 22 are disclosed in U.S. Pat. No. 5,413,194 to Kulis et al.

In one embodiment, the friction material 24 includes multiple different compositions 64, 66, such as a cold compact including two or more different compositions 64, 66. For example, the friction material 24 can include a first composition 64, such as an underlayer or backing layer, and a second composition 66, such as a conventional friction material, as shown in FIGS. 3 and 6.

Once the backplate 26, receptacle plate 20, and friction material 24 are provided, the method next includes integrally molding the friction material 24 to the backplate 26 to form the brake assembly 22. The molding process first includes aligning the back surface 50 of the backplate 26 and the receiving surface 34 of the receptacle plate 20 parallel to one another, and aligning the opening axis $A_o$ of each opening 30 of the backplate 26 with the pin axis $A_p$ of one of the pins 28 of the receptacle plate 20. The method next includes disposing the back surface 50 of the backplate 26 on the receiving surface 34 of the receptacle plate 20 and spacing each pin 28 of the receptacle plate 20 from the adjacent inner wall 54 of the opening 30 of the backplate 26. The pin 28 of the receptacle plate 20 and the inner wall 54 of the backplate 26 present a space 68 therebetween, as shown in FIGS. 2, 3, 5, and 6. If the backplate 26 includes the support pins 29, the support surface 60 engages the receiving surface 34 of the receptacle plate 20. For example, in the embodiments of FIGS. 5 and 6, the method includes disposing the back surface 50 of the backplate 26 on the ledge 44 and on at least one pin 28 of the receptacle plate 20 to present the channel 62 between the back surface 50 of the backplate 26 and the depressed surface 46 of the receptacle plate 20.

Once the backplate 26 and receptacle plate 20 are aligned with one another, the method includes disposing the receptacle plate 20 and the backplate 26 in a cavity of a molding apparatus between a pair of opposing compression plates 70. The compression plates 70 are typically parallel to one another, as shown in FIG. 2. The method also includes preheating the molding apparatus to a predetermined temperature, which can be done before or after the backplate 26 and receptacle plate 20 are placed in the molding apparatus.

After preheating the molding apparatus, the method includes injecting or otherwise disposing the friction material 24 in the molding apparatus and onto the front surface 48 of the backplate 26, as shown in FIG. 5. The friction material 24 has a material thickness $t_m$ extending between opposite sides of the friction material 24. Prior to applying pressure to the friction material 24, the friction material 24 typically has a material thickness $t_m$ from 0.440 to 0.470 inches. The material thickness $t_m$ can vary depending on the backplate thickness $t_b$, receptacle plate thickness $t_r$, pin height $h_p$, type of friction material 24, and desired degree of cure.

Next, the method includes heating the friction material 24 and the receptacle plate 20, and forcing the friction material 24 through the openings 30 of the backplate 26. In one embodiment, the forcing step includes using the compression plates 70 of the molding apparatus to apply an isostatic compression force or isostatic pressure to the friction material 24 or the receptacle plate 20. Typically the force or pressure is applied to both the friction material 24 and the receptacle plate 20 simultaneously. The heated friction material 24 flows along the inner walls 54 of the openings 30 of the backplate 26, along the pins 28 of the receptacle plate 20, and to and along the receiving surface 34 of the receptacle plate 20. If the receptacle plate 20 includes the ledge 44 and depressed surface 46, as shown in FIGS. 5 and 6, then the friction material 24 also flows through the channels 62, along the back surface 50 of the backplate 26, and along the depressed surface 46 of the receptacle plate 20.

The method includes inserting the pins 28 into the friction material 24 by applying the force to the friction material 24 and/or receptacle plate 20. The pins 28 extend to the center portion 32 of the friction material 24, which is a portion of the friction material 24 not exposed to the surrounding ambient or other components. The pins 28 typically extend through a portion of the friction material 24, but may extend all the way through the friction material 24. When the pressure is applied to the friction material 24, the friction material 24 has a greater material thickness $t_m$ at the openings 30 of the backplate 26, as shown in FIG. 2. In an exemplary embodiment, the material thickness $t_m$ of the friction material 24 along the openings 30 and pins 28, after applying the pressure or force to the friction material 24, is from 0.660 inches to 0.690 inches. In one preferred embodiment, the pins 28 extend into at least 5%, preferably at least 8%, and more preferably at least 25% of the material thickness $t_m$ of the friction material 24, based on the material thickness $t_m$ at the openings 30 of the backplate 26 after applying the pressure or force to the to the friction material 24. During the molding process, the heated friction material 24 completely surrounds and encases the pins 28 of the receptacle plate 20. If the channel 62 is provided between the receptacle plate 20 and backplate 26, then the friction material 24 also covers a portion of the back surface 50 of the backplate 26.

If the friction material 24 includes multiple compositions 64, 66, such as the first composition 64 and the second composition 66, the first composition 64 is disposed on the front surface 48 of the backplate 26 and the second composition 66 is disposed on the first composition 64. Alternately, the first composition 64 and the second composition 66 are charged into the molding apparatus and disposed on the front surface 48 together in a pre-compacted preform. During the molding process, once the heat and force is applied to the friction material 24, the first composition 64 flows through the openings 30, followed by the second composition 66, as shown in FIGS. 3 and 6. The first composition 64 or underlayer typically flows easily through the openings 30 of the backplate 26 while most of the second composition 66 remains along the front surface 48 of the backplate 26.

The heating and forcing steps include applying enough heat and pressure to integrally mold the friction material 24 to the backplate 26 and at least partially cure the friction material 24. The molding times and temperatures vary based on the type of friction material 24. During the heating step, heat is transferred from the receptacle plate 20 to the friction material 24, which helps to cure the friction material 24. The friction material 24 is typically molded into a desired shape, such as a pad, as shown in FIG. 8.

The pins 28 transfer additional heat from the receptacle plate 20 to the friction material 24, compared to a receptacle plate of the prior art without the pins. The pins 28 especially provide a significant amount of heat to the interior or center portion 32 of the friction material 24. During the molding process, the temperature at the interior or center portion 32 of the friction material 24 increases faster, and the temperature is higher than it would be if the receptacle plate 20 included no pins 28. The faster heating provided to the center portion 32 of the friction material 24 allows any gases generated during the curing process to be removed more quickly and improves the amount of compaction of the friction material 24 along the openings 30 of the backplate 26. The faster heating and higher temperature also improves the degree of curing of the friction material 24 and reduces or eliminates the susceptibility of the friction material 24 to delaminate. The improved curing provided by the receptacle plate 20 with pins 28 also reduces or eliminates blistering of the friction material 24. In the embodiments wherein the friction material includes a mixture of two or more compositions 64, 66, such as the embodiments of FIGS. 3 and 6, the faster heating provides better flow characteristics to the mixture.

The molding process concludes by removing the integrally molded friction material 24 and backplate 26 from the molding apparatus. In some cases, the curing of the integrally molded friction material 24 and backplate 26 is completed in a curing oven. An example of the finished brake assembly 22 product, including the pad of friction material 24 integrally molded to the backplate 26 is shown in FIG. 8. The brake assembly 22 can be used in a variety of automotive vehicle applications, such as a brake caliper system.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

ELEMENT LIST

| Element Symbol | Element Name |
| --- | --- |
| d | distance |
| 20 | receptacle plate |
| 22 | assembly |
| 24 | friction material |
| 26 | backplate |
| 28 | pins |
| 29 | support pins |
| 30 | opening |
| 32 | center portion |

ELEMENT LIST

| Element Symbol | Element Name |
| --- | --- |
| 34 | receiving surface |
| 36 | compression surface |
| 38 | receptacle outer surface |
| 40 | side surface |
| 42 | heat transfer surface |
| 44 | ledge |
| 46 | concave surface |
| 48 | front surface |
| 50 | back surface |
| 52 | plate outer surface |
| 54 | inner wall |
| 56 | mounting features |
| 58 | outer surface |
| 60 | support surface |
| 62 | channel |
| 64 | first composition |
| 66 | second composition |
| 68 | space |
| 70 | compression plates |
| $A_o$ | opening axis |
| $A_p$ | pin axis |
| $D_o$ | opening diameter |
| $D_p$ | pin diameter |
| $h_p$ | pin height |
| $h_s$ | support pin height |
| $t_b$ | backplate thickness |
| $t_m$ | material thickness |
| $t_r$ | receptacle plate thickness |

What is claimed is:

1. A tool for producing a brake assembly including a friction material molded to at least one opening of a backplate, comprising:
   a receptacle plate presenting a receiving surface for supporting the backplate, said receiving surface presenting a ledge extending along a depressed surface;
   said receptacle plate including at least one pin extending transversely from said depressed surface to a heat transfer surface for extending through one of the openings of the backplate and transferring heat to the friction material when the friction material is forced into the openings, and
   said receptacle plate presenting a first receptacle plate thickness extending from said ledge of said receiving surface to an oppositely facing compression surface and a second receptacle plate thickness extending from said heat transfer surface of said at least one pin to said compression surface, and wherein said first receptacle plate thickness is equal to said second receptacle plate thickness.

2. A tool as set forth in claim 1, wherein said receptacle plate includes a plurality of said pins spaced from one another by the depressed surface.

3. A tool as set forth in claim 1, wherein said heat transfer surface of said at least one pin is flat and parallel to said receiving surface.

4. A tool as set forth in claim 1, wherein said pin is tapered from said depressed surface to said heat transfer surface and said heat transfer surface is round.

5. A tool as set forth in claim 1, wherein at least a portion of said depressed surface is planar and said pin extends perpendicular to said depressed surface.

6. A tool as set forth in claim 1, wherein said pin presents a conical shape.

7. A tool as set forth in claim 1 wherein said depressed surface of said receptacle plate is concave.

8. A tool as set forth in claim 1 further including a backplate, and wherein said backplate includes support pins engaging said depressed surface of said receptacle plate.

9. A tool for producing a brake assembly including a friction material molded to a backplate, comprising:
a receptacle plate formed of metal material, a ceramic material, a carbon-based material, or an organic material,
said receptacle plate presenting a receiving surface and an oppositely facing compression surface,
said receiving surface and said compression surface being parallel to one another,
said receiving surface and said compression surface extending continuously between and surrounded by receptacle outer surfaces,
said receiving surface presenting a ledge extending along a depressed surface;
said receptacle plate include a plurality of pins each extending transversely from said depressed surface for being aligned with openings of the backplate and transferring heat to the friction material when the friction material is forced through the openings of the backplate,
said pins each including a side surface extending upwardly along a pin axis from said depressed surface to a heat transfer surface,
said heat transfer surfaces of said pins facing away from said depressed surface,
said receptacle plate presenting a first receptacle plate thickness extending from said ledge of said receiving surface to said compression surface and a second receptacle plate thickness extending from said heat transfer surfaces of said pins to said compression surface, and
said first receptacle plate thickness being equal to said second receptacle plate thickness.

10. A tool for producing a brake assembly including a friction material molded to a backplate, comprising:
a receptacle plate including a receiving surface, said receiving surface presenting a ledge extending along a depressed surface;
a backplate disposed on said ledge of said receptacle plate and including at least one opening, said backplate and said depressed surface of said receptacle plate presenting a channel therebetween; and
said receptacle plate including at least one pin extending upwardly from said depressed surface through one of said openings of said backplate for transferring heat to the friction material when the friction material is forced into said at least one opening of said backplate.

11. A method for producing a brake assembly including friction material molded to a backplate, comprising the steps of:
providing a backplate including a front surface and an oppositely facing back surface and at least one opening extending from the front surface to the back surface wherein the openings each have an opening diameter,
providing a receptacle plate including a receiving surface, wherein the receiving surface presents a ledge disposed along a depressed surface and at least one pin extends transversely from the depressed surface,
aligning the openings of the backplate with the pins of the receptacle plate wherein the pins each have a pin diameter less than the opening diameter of the aligned opening,
disposing the back surface of the backplate on the ledge and on at least one pin of the receptacle plate to present a channel between the back surface of the backplate and along the depressed surface of the receptacle plate,
disposing a friction material on the front surface of the backplate,
heating the friction material and the receptacle plate, and
forcing the friction material through the openings of the backplate into the channel and along the pins.

12. A method as set forth in claim 11, wherein each opening of the backplate is presented by an inner wall, and including the step of presenting a space between each of the inner walls and the aligned pins of the receptacle plate, and wherein the forcing step includes forcing the friction material into the spaces between the inner walls of the backplate and the aligned pins.

13. A method as set forth in claim 11 including inserting the pins of the receptacle plate into the friction material of the backplate during the heating step.

14. A method as set forth in claim 11, wherein the friction material has a material thickness and the pins extend into at least 5% of the material thickness after forcing the friction material through the openings of the backplate.

15. A method as set forth in claim 11, wherein the depressed surface of the receptacle plate is a concave surface.

16. A method as set forth in claim 11, wherein the step of disposing a friction material on the front surface of the backplate includes disposing a first composition on the front surface and disposing a second composition on the first composition.

17. A method as set forth in claim 11, wherein the heating and forcing steps include at least partially curing the friction material.

18. A method as set forth in claim 11, wherein the step of disposing a friction material on the front surface of the backplate includes disposing a first composition and a second composition on the front surface together in a pre-compacted preform.

19. A method as set forth in claim 11 including heating the friction material until the friction material flows through the openings of the backplate and surrounds the pins of the receptacle plate.

20. A method as set forth in claim 11, wherein the friction material has a material thickness from 0.440 to 0.470 inches prior to forcing the friction material through the openings of the backplate.

21. A method for producing a brake assembly including friction material molded to a backplate, comprising the steps of:
providing a backplate including a front surface and an oppositely facing back surface,
the front surface and the back surface of the backplate being parallel to one another,
the front surface and the back surface extending continuously between and surrounded by plate outer surfaces,
said backplate presenting a plurality of opening each extending from the front surface to the back surface,
each of the openings of the backplate being presented by an inner wall extending around an opening axis,
each of the inner walls presenting a cylindrical shape with an opening diameter,
providing a receptacle plate including a receiving surface, the receiving surface presenting a ledge disposed along a depressed surface and pins extending transversely from the depressed surface, wherein each of the pins presents a pin diameter,
the steps of providing the backplate and providing the receptacle plate including providing the pin diameters less than the opening diameters,
aligning the back surface of the backplate and the receiving surface of the receptacle plate parallel to one another, aligning the opening axis of each opening of the backplate with the pin axis of one of the pins of the receptacle plate, disposing the back surface of the backplate on the ledge and on at least one pin of the receptacle plate to present a channel between the back surface of the backplate and along the depressed surface of the receptacle plate, spacing each pin of the receptacle plate from the adjacent inner wall of the backplate to present a space between each pin and inner wall of the backplate along the opening, disposing the receptacle plate and the backplate in a molding apparatus between a pair of opposing compression plates, preparing a friction material, the friction material including at least one of minerals, organic particles, ceramics, aramids, resins, organic particles, cashew nut shell particles, rubber, metal particles, binders, and wherein the friction material includes no asbestos, disposing the friction material on the front surface of the backplate, the friction material having a material thickness from 0.440 to 0.470 inches, heating the friction material and the receptacle plate, forcing the friction material through the openings of the backplate along the inner walls of the openings of the backplate into the channel and along the depressed surface of the receptacle plate and along the pins of the receptacle plate and extending the pins to a center portion of the friction material, the forcing step including using the compression plates of the molding apparatus to apply an isostatic compression force to the friction material and the receptacle plate, and the heating and forcing steps including applying enough heat and pressure to mold the friction material to the backplate at least partially cure the friction material.

* * * * *